(12) United States Patent
Yoneda et al.

(10) Patent No.: US 10,586,656 B2
(45) Date of Patent: Mar. 10, 2020

(54) PRESSURE VALVE AND ELECTROLYTIC CAPACITOR

(71) Applicant: NICHICON CORPORATION, Kyoto-shi (JP)

(72) Inventors: Mitsuru Yoneda, Kyoto (JP); Takaya Sakai, Kyoto (JP); Kenta Kawanishi, Kyoto (JP); Kazuya Yamanaka, Kyoto (JP)

(73) Assignee: NICHICON CORPORATION, Kyoto-Shi (JP)

( * ) Notice: Subject to any disclaimer, the term of this patent is extended or adjusted under 35 U.S.C. 154(b) by 0 days.

(21) Appl. No.: 15/769,415

(22) PCT Filed: Oct. 7, 2016

(86) PCT No.: PCT/JP2016/080022
§ 371 (c)(1),
(2) Date: Apr. 19, 2018

(87) PCT Pub. No.: WO2017/069010
PCT Pub. Date: Apr. 27, 2017

(65) Prior Publication Data
US 2018/0323013 A1  Nov. 8, 2018

(30) Foreign Application Priority Data

Oct. 21, 2015 (JP) .................................. 2015-207205

(51) Int. Cl.
*H01G 9/12* (2006.01)
*H01G 11/18* (2013.01)
(Continued)

(52) U.S. Cl.
CPC .............. *H01G 9/12* (2013.01); *F16K 17/02* (2013.01); *H01G 9/10* (2013.01); *H01G 11/18* (2013.01);
(Continued)

(58) Field of Classification Search
CPC . H01G 9/12; H01G 9/10; H01G 11/18; H01G 11/78; H01G 11/80; F16K 17/02; Y02E 60/13
(Continued)

(56) References Cited

U.S. PATENT DOCUMENTS 3,664,875 A    5/1972  Graf
2009/0273886 A1  11/2009  Miura et al.
(Continued)

FOREIGN PATENT DOCUMENTS

CN    101313378    11/2008
EP     1854502     11/2007
(Continued)

OTHER PUBLICATIONS

WIPO, PCT International Search Report & Written Opinion of PCT/JP2016/080022 dated Jan. 10, 2017.
(Continued)

*Primary Examiner* — Michael P McFadden
(74) *Attorney, Agent, or Firm* — Lex IP Meister, PLLC

(57) ABSTRACT

A pressure valve to be arranged in a seal member sealing a casing in which a capacitor element is housed, the pressure valve having a base end positioned within the case and a tip positioned outside the case. The pressure valve includes a tapered portion having a tapered shape. At the top portion of the tapered portion, there is formed a slit able to undergo a state change between a close-state and an open-state by elastic deformation. When the casing internal pressure is less than a certain value, the slit maintains the close-state. When the casing internal pressure has reached the certain value, the slit undergoes a state change to the open-state, whereby the inside and outside of the case communicate with each other and the internal pressure is released from within the case.

9 Claims, 11 Drawing Sheets

(51) Int. Cl.
*H01G 11/80* (2013.01)
*H01G 9/10* (2006.01)
*F16K 17/02* (2006.01)
*H01G 11/78* (2013.01)

(52) U.S. Cl.
CPC ............ *H01G 11/78* (2013.01); *H01G 11/80* (2013.01); *Y02E 60/13* (2013.01)

(58) Field of Classification Search
USPC ........................................................ 361/521
See application file for complete search history.

(56) References Cited

U.S. PATENT DOCUMENTS

| | | | | |
|---|---|---|---|---|
| 2011/0108139 | A1* | 5/2011 | Wright | F16K 15/147 137/511 |
| 2012/0114988 | A1 | 5/2012 | Matsuura et al. | |
| 2014/0240900 | A1* | 8/2014 | Mori | H01G 9/12 361/521 |

FOREIGN PATENT DOCUMENTS

| | | | |
|---|---|---|---|
| EP | 1854502 A1 * | 11/2007 | ............ A61M 39/24 |
| FR | 706854 | 6/1931 | |
| GB | 2013962 | 8/1979 | |
| JP | 54-012647 | 6/1979 | |
| JP | 59-093062 | 6/1984 | |
| JP | 2004-71725 | 3/2004 | |
| JP | 2004-190803 | 7/2004 | |
| JP | 2005-93941 | 4/2005 | |
| JP | 2007-035818 | 2/2007 | |
| WO | 2007/069538 | 6/2007 | |

OTHER PUBLICATIONS

SIPO, Office Action of CN 201610895048.2 dated Apr. 2, 2019.
EPO, the extended European search report of EP 16857325.1 dated May 15, 2019.
SIPO, Office Action of CN 201610895048.2 dated Oct. 9, 2019.

* cited by examiner

PRESSURE VALVE AND ELECTROLYTIC CAPACITOR

TECHNICAL FIELD

The present invention relates to a pressure valve for an electrolytic capacitor and an electrolytic capacitor having such a pressure valve.

BACKGROUND ART

There has been an electrolytic capacitor or an electric double layer capacitor which includes a casing accommodating therein a capacitor element, a seal member configured to seal the casing, and a pressure valve closing a through hole provided to the seal member (see PTL 1). As the pressure valve, a pressure valve 810 having a flat portion 811 as shown in FIG. 11A or a pressure valve 910 having a flat portion 911 as shown in FIG. 11B are used.

When the internal pressure of the casing reaches a certain value, the flat portions 811 and 911 rupture, whereby the gas in the casing is discharged.

CITATION LIST

Patent Literature

[PTL 1] Japanese Unexamined Patent Publication No. 2005-93941

SUMMARY OF INVENTION

Technical Problem

The capacitor element accommodated in the casing is impregnated with an electrolyte solution. When the internal pressure of the casing reaches a certain value, the capacitor element is at a high temperature, and the electrolyte solution evaporates and dissipates in the casing. If the pressure valve 810 or 910 ruptures during this state, the electrolyte solution, along with the gas, evaporates and dissipates outside the casing from the ruptured pressure valve, which reduces the electrostatic capacity of the capacitor and increases the loss. This results in a wear-out failure of the capacitor, and the life of the capacitor is shortened.

An object of the present invention is to provide a pressure valve and an electrolytic capacitor whose life is improved by avoiding rupture of the pressure valve.

Solution to Problem

An aspect of the present invention is a pressure valve to be arranged in a seal member configured to seal a casing accommodating therein a capacitor element, in such a manner that a base end of the pressure valve is positioned inside the casing whereas a tip of the pressure valve is positioned outside the casing, the pressure valve comprising a tapered portion having a tapered shape, wherein: a top portion of the tapered portion has a slit which is state-changeable between an open-state and a close-state through elastic deformation; and the slit keeps its close-state while a casing internal pressure is less than a certain value, whereas the slit changes its state to the open-state when the casing internal pressure reaches the certain value, thereby releasing the casing internal pressure by communicating the inside and the outside of the casing.

The above structure has the tapered portion having a tapered shape, and a force for returning to the close-state by elastic deformation (hereinafter, "strained force") acts on the slit in the open-state. The state of the slit changes to the open-state only when the casing internal pressure reaches the certain value so as to release the casing internal pressure. When the casing internal pressure becomes less than the certain value, the strained force changes the state of the slit back to the close-state and keeps the state. As the result, the casing internal pressure having reached the certain value is released without rupturing the pressure valve, thus contributing to improved life of the capacitor. Further, the structure exerts an action of allowing only a flow from the inside to the outside of the casing, and prohibits a flow from the outside to the inside of the casing (hereinafter, "check-valve action"), an entry of a contaminant into the casing (contamination) is prevented.

The above structure is preferably such that the tapered portion is formed in a circular frustum shape or a polygonal frustum shape. These shapes increases the strained force, and effectively achieves the check-valve action.

It is preferable that the top portion of the tapered portion has a flat shape such that a length relative to a first direction which is perpendicular to an axial direction connecting the tip and the base end is longer than a second direction which is perpendicular to the axial direction and to the first direction, and the slit extends in a direction crossing the first direction. When the casing internal pressure is released, the above structure effectively prevents the pressure valve from splitting at the vicinity of both ends of the slit, in the direction in which the slit extends, which causes an increase in the slit length. Therefore, a drop in the pressure resistance of the pressure valve due to an increase in the slit length is restrained.

In the above case, the tapered shape may be such that the thickness relative to the first direction is constant irrespective of the height relative to the axial direction, and the thickness relative to the second direction is reduced as it gets closer to the tip. This further effectively prevents an increase in the slit length.

Further, in the above case, the slit may extend in the second direction. This further effectively prevents an increase in the slit length.

Further, the above structure is preferably such that the slit is rectilinearly formed in a plan view. The rectilinear slit increases the strained force. This way, the check-valve action is achieved more effectively.

Further, the above structure is preferably such that the slit is formed in a shape tapered in the thickness direction of the top portion. Narrowing one of the entrance and the outlet of the slit while widening the other ensures the structural strength, increases the strained force, and more effectively achieves the function of the check valve.

Further, the above structure preferably includes: a valve main body to be at least partially arranged in a through hole formed on the seal member, and a flange connected to the base end of the valve main body, whose diameter is larger than the through hole, wherein the tapered portion is formed at the tip of the valve main body.

In the above structure, when the pressure valve is arranged in the seal member, the valve main body is arranged in the through hole, and the flange is arranged below walls surrounding the through hole. Therefore, even when the amount of gas in the casing increases and pushes the pressure valve towards outside the casing, the flange is hooked on the wall, thus preventing the pressure valve from departing from the seal member.

The capacitor of the present invention includes: the above-described pressure valve, the seal member with the pressure valve arranged, the casing sealed by the seal member, and the capacitor element accommodated in the casing.

With the above-described pressure valve, the electrolyte solution impregnated in the capacitor element is prevented from being overly released outside the casing, and the life of capacitor is thereby prevented from being shortened. Further, since the surrounding of the slit of the pressure valve functions as a check valve, contamination of the inside of the casing is restrained. Further, since failure due to rupture of the pressure valve is unlikely, it is possible to improve the life of the capacitor.

Advantageous Effects of Invention

With the present invention, rupture of the pressure valve is avoided. This contributes to improved life of the capacitor.

DESCRIPTION OF EMBODIMENTS

The following will describe preferred embodiments of the present invention with reference to figures. First described is an electrolytic capacitor of a first embodiment related to the present invention, with reference to attached drawings.

First Embodiment

Figure 1A:
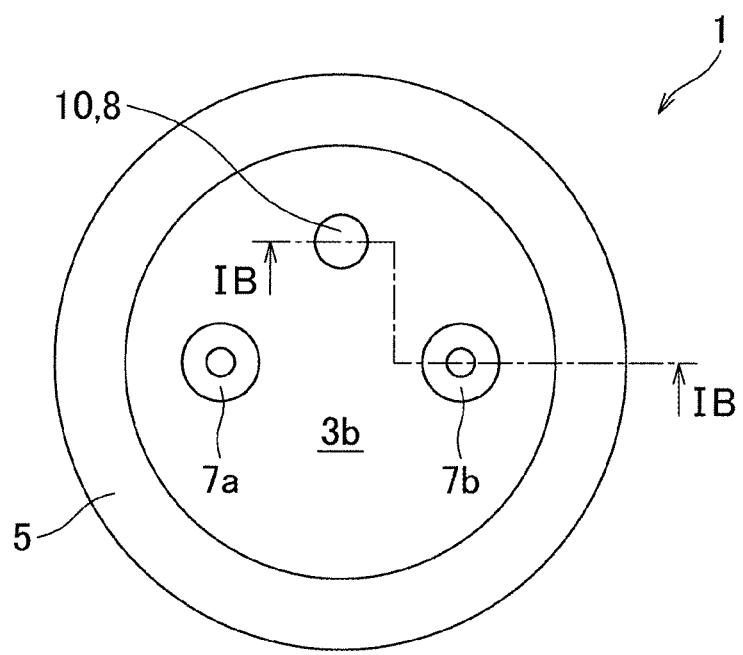
FIG. 1A A plan view showing an electrolytic capacitor related to a first embodiment of the present invention.
Figure 1B:
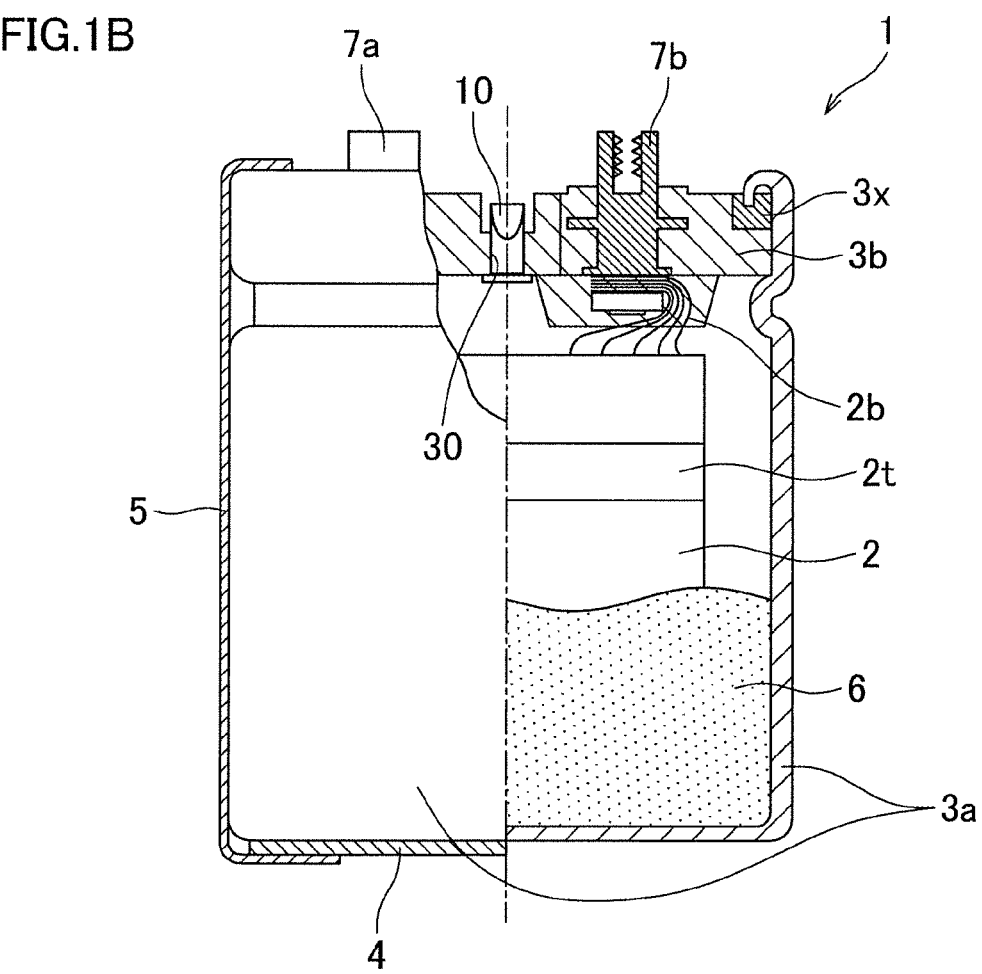
FIG. 1B A partial cross sectional view taken along a line IB-IB in FIG. 1A, and which shows an overall structure of the electrolytic capacitor related to the first embodiment of the present invention.

As shown in FIG. 1A and FIG. 1B, an electrolytic capacitor 1 includes: a capacitor element 2, a casing 3a, a seal member 3b, a bottom plate 4, a sleeve 5, a fixture member 6, terminals 7a and 7b, and a pressure valve 10.

The casing 3a is for accommodating therein the capacitor element 2, and has its opening portion engaged with the seal member 3b. The seal member 3b seals the casing 3a. The casing 3a is made of a metal (e.g., aluminum), and the seal member 3b is made of an insulative material (e.g., modified phenolic resin). A packing 3x made of an elastic material (e.g., rubber) is arranged on the upper rim of the seal member 3b. The packing 3x has a function of preventing gas in the casing 3a from leaking through a gap between the seal member 3b and the casing 3a. The upper end of the casing 3a is caulked and fixed to the packing 3x.

The bottom plate 4 is a circular film made of an insulative material (e.g., flame retardant polyester) and arranged so as to overlap the under surface of the bottom portion of the casing 3a. The sleeve 5 is a substantially cylindrical member made of an insulative material (e.g., polyolefin) and covers the side circumference of the case 3a, the lower rim of the bottom plate 4, and the upper rim of the casing 3a. Between the lower portion of the sleeve 5 and the bottom portion of the casing 3a, the bottom plate 4 is sandwiched and fixed.

The fixture member 6 fixes the capacitor element 2 to the inside of the casing 3a, and is made of a thermoplastic resin (e.g., polypropylene).

The terminals 7a and 7b and the pressure valve 10 are arranged in the seal member 3b. The terminals 7a and 7b are spaced apart from each other at positions that are point symmetrical with respect to the center of the seal member 3b when viewed in the thickness direction of the seal member 3b. The terminals 7a and 7b are made of metal (e.g., aluminum). The cathode terminal 7a is connected to a cathode lead 2a of the capacitor element 2, and the anode terminal 7b is connected to an anode lead 2b of the capacitor element 2 (see FIG. 2).

As shown in FIG. 1B, in the seal member 3b, a through hole 30 communicating the inside and the outside of the casing 3a is formed between the center of the seal member 3b when viewed in the thickness direction (the midpoint between the terminal 7a and the terminal 7b) and the outer edge. The pressure valve 10 is disposed so as to close the through hole 30, and is fixed to the seal member 3b by a lock washer (not shown) arranged on the upper surface. The pressure valve 10 has a function of emitting gas inside the casing 3a. The pressure valve 10 is formed of a non-diene based rubber such as IIR, EPDM, silicone rubber and fluorine rubber, or a diene type rubber such as CR and the like.

Figure 2:
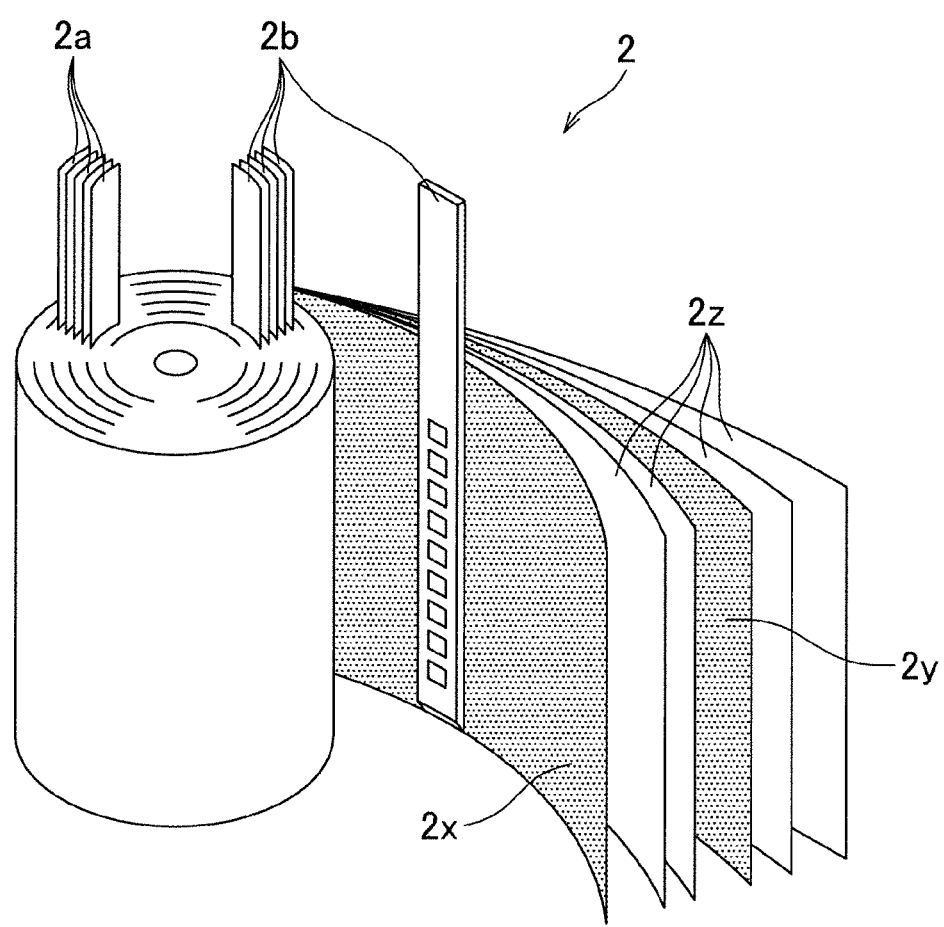
FIG. 2 An exploded perspective view of a capacitor element shown in FIG. 1A and FIG. 1B.

Next, with reference to FIG. 2, the structure of the capacitor element 2 is detailed.

The capacitor element 2 is formed as follows. Namely, an anode foil 2y and a cathode foil 2x to which an anode lead 2b and a cathode lead 2a are attached respectively are wound with a separator 2z made of an insulative material (e.g., craft paper) therebetween. The outer circumference of the wound object thus formed is fixed by an element stopper tape 2t (see FIG. 1B), and then impregnated with an electrolyte solution for driving. The anode foil 2x and the cathode foil 2y are formed by roughening the surface of aluminum foil, and the anode foil 2x further has an anodized film formed on the surface.

Next, the structure of the pressure valve is detailed with reference to FIG. 3 and FIG. 4.

Figure 3:
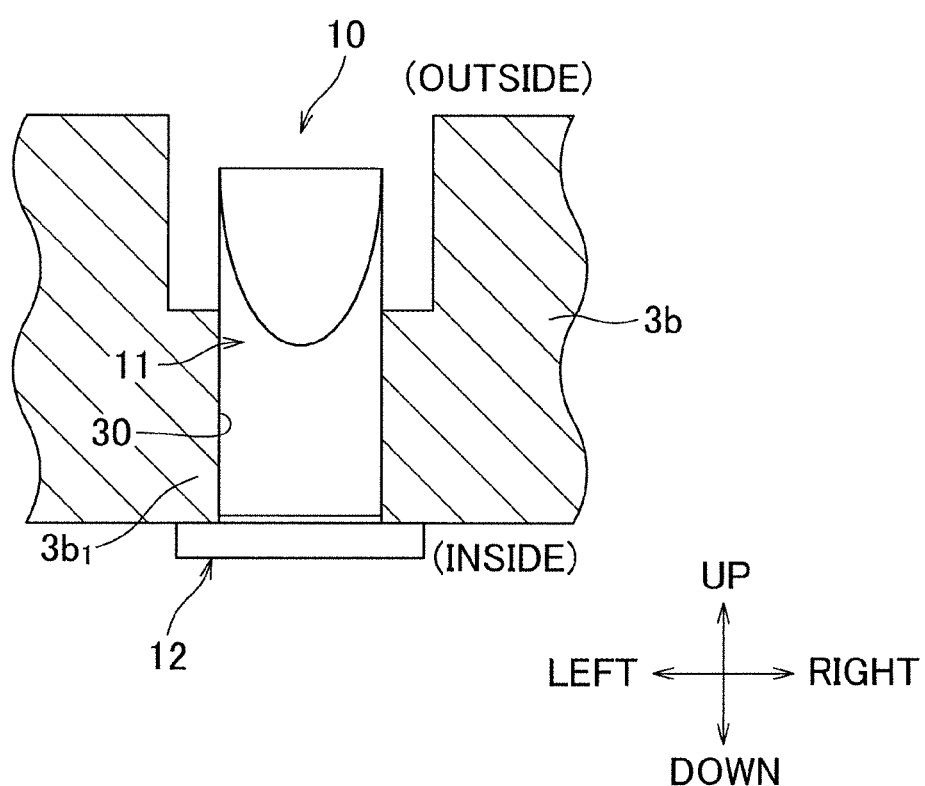
FIG. 3 An enlarged view of the periphery of a pressure valve as viewed from the front.

As shown in FIG. 3, the pressure valve 10 is arranged in the seal member so that the tip thereof is positioned outside the casing 3a whereas its base end positioned inside the casing 3a.

The pressure valve 10 includes a valve main body 11 extended in a vertical direction, and a flange 12 connected to the base end of the valve main body 11. The vertical direction herein refers to a direction connecting the tip and the base end of the pressure valve 10 (axial direction), and is also an axial direction of the through hole 30. The valve main body 11 is disposed in the through hole 30 from the base end to a height of approximately 3/5. The flange 12 has a diameter greater than the through hole 30, and is arranged below a wall portion 3b1 surrounding the through hole 30 of the seal member 3b.

Figure 4A:
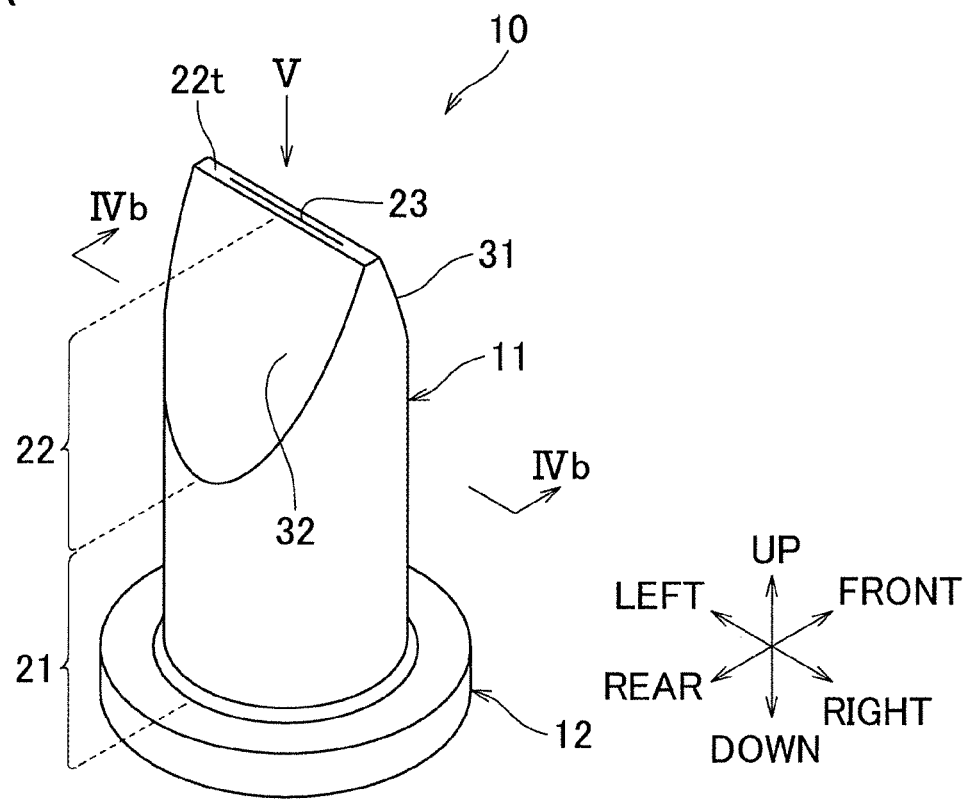
FIG. 4A A perspective view of the pressure valve.

As shown in FIG. 4A, the valve main body 11 includes: a tubular cylindrical portion 21 extended upward from the base end; and a tapered portion 22 formed above the cylindrical portion 21.

The tapered portion 22 is formed at the tip of the valve main body 11.

The diameter of the cylindrical portion 21 is constant. The tapered portion 22 is tapered relative to the front-rear direction in FIG. 4A (which corresponds to "second direction" of the present invention and a direction perpendicular to an extending direction of a later-described slit 23), as it gets closer to the tip of the valve main body 11 (i.e., the thickness relative to the front-rear direction gets smaller towards upper side). It should be noted that the width of the tapered portion 22 is constant relative to the left-right direction (corresponding to "first direction" of the present invention and an extending direction of the slit 23) (i.e., the thickness relative to the left-right direction is the same at any position relative to the vertical direction).

Figure 4B:
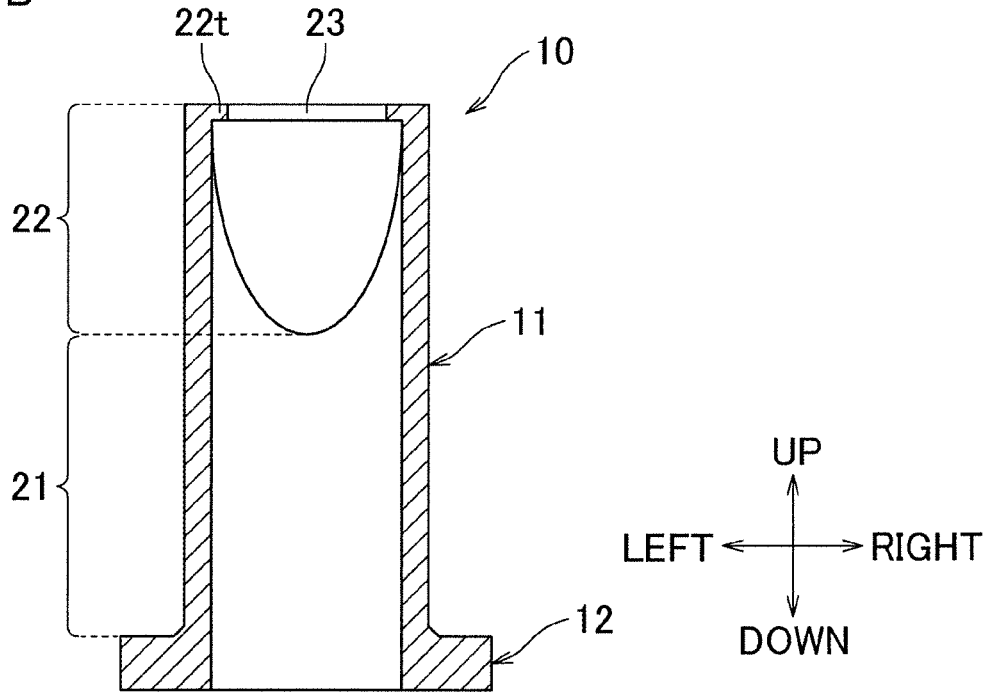
FIG. 4B A cross sectional view of the pressure valve, taken along a line IVb-IVb of FIG. 4A.

In the uppermost position of the tapered portion 22, an elongated top portion 22t is formed. The top portion 22t has substantially a rectangular planar shape whose size relative to the left-right direction is longer than the size relative to the front-rear direction. The top portion 22t has a rectilinear slit 23 which is long in the left-right direction. As shown in FIG. 4B, the slit 23 is formed so that its width relative to the left-right direction is constant in the thickness direction of the top portion 22t (vertical direction) (i.e., the width relative to the left-right direction is the same at any position relative to the vertical direction). The periphery of the slit 23 is elastically deformable, so that the slit 23 is state-changeable between a close-state and an open-state. When the slit 23 opens, the internal space of the pressure valve 10 communicates with the outside.

As shown in FIG. 4B, the pressure valve 10 is a hollow member whose lower end is open.

Next, opening and closing operations of the slit 23 are described with reference to FIG. 5A and FIG. 5B.

Figure 5A:
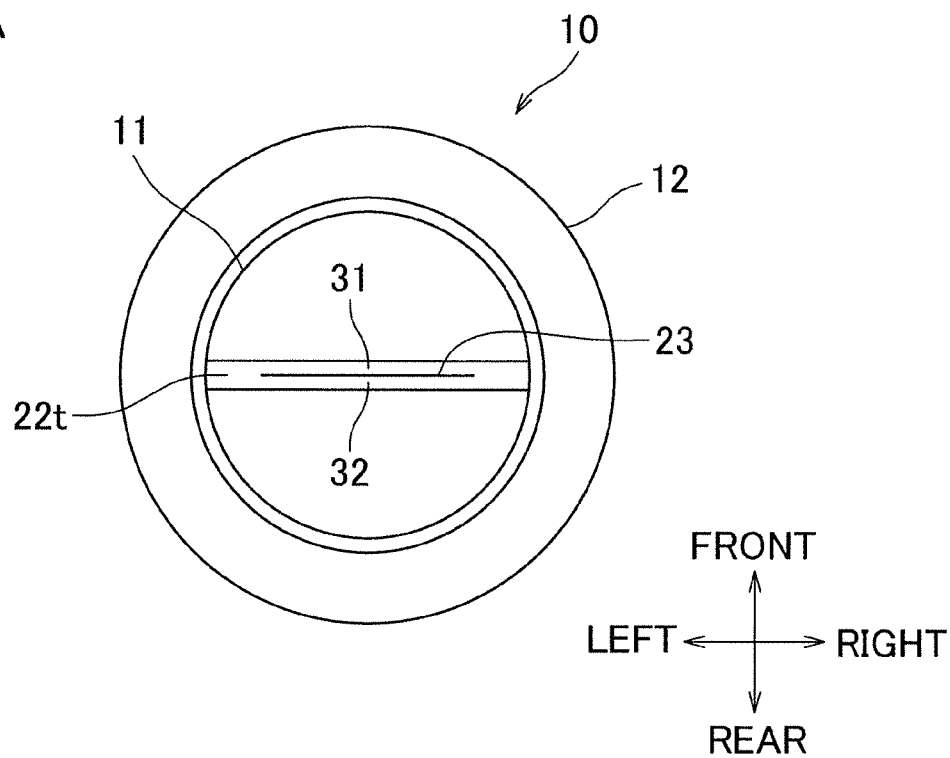
FIG. 5A A plan view of the pressure valve viewed from a direction V in FIG. 4A, which shows a state where the slit is closed.

When the internal pressure of the casing 3a is less than a certain value as in FIG. 1B, the close-state of the slit 23 as shown in FIG. 5A is maintained.

Figure 5B:
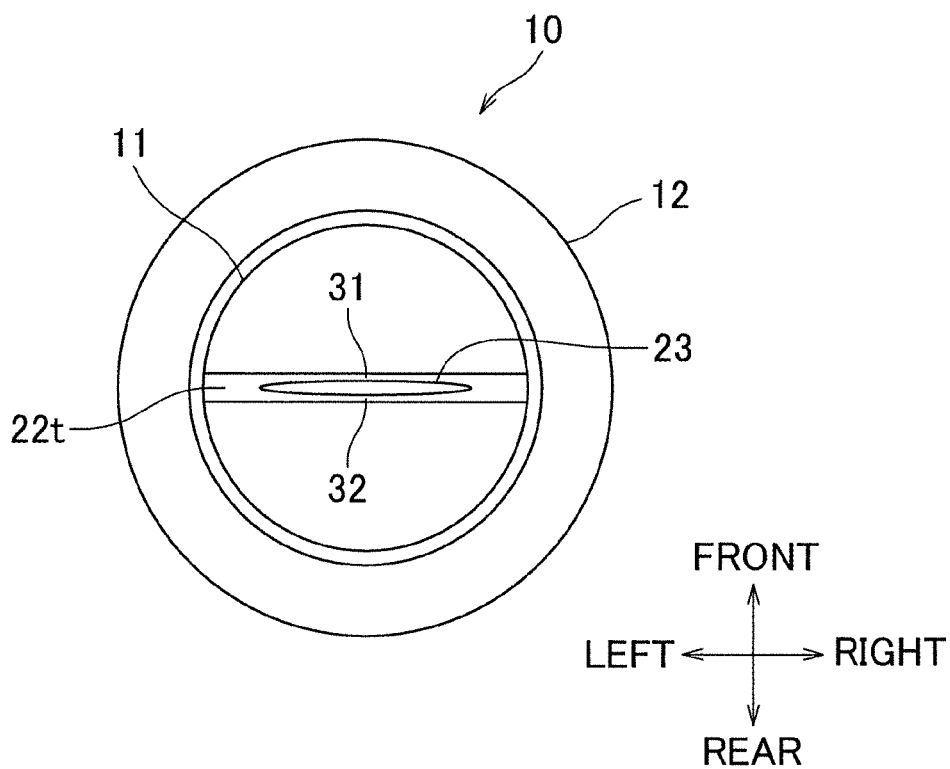
FIG. 5B A plan view of the pressure valve viewed from the direction V in FIG. 4A, which shows a state where the slit is opened.
Figure 11A:
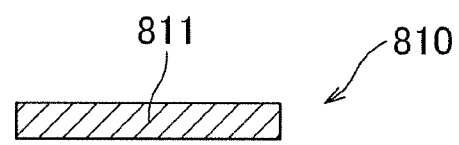
FIG. 11A A cross sectional view of a conventional pressure valve.
Figure 11B:
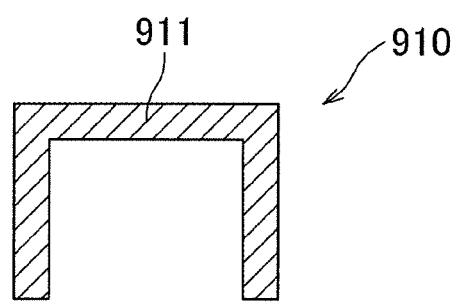
FIG. 11B A cross sectional view of another conventional pressure valve.

When the internal pressure in the casing 3a reaches the certain value, the slit 23 opens as shown in FIG. 5B, and communicates the inside and the outside of the casing 3a, thus releasing the internal pressure of the casing 3a. This way the gas inside the casing 3a is released. Here, in cases of a conventional pressure valve 810 as shown in FIG. 11A,
the time when internal pressure of the casing 3a reaching a certain value corresponds to the time when a flat portion 811 is ruptured. Further, it corresponds to the time when a flat portion 911 is ruptured, in cases of a conventional pressure valve 910 as shown in FIG. 11B. The internal pressure of the casing 3a reaches a certain value in the following cases, for example. Namely, examples include a case of forming an anodized film on the cathode foil by a reverse voltage, and a case of repairing an anodized film of the anode foil, which film is damaged by overvoltage, overcurrent, and the like by an electrolyte solution. In these cases, hydrogen gas is generated. During formation and repair of the film, the capacitor element generates heat and raises the temperature in the casing, thus evaporating the electrolyte solution.

The opening of slit 23 is significantly smaller than an opening which is formed by rupture of the conventional pressure valve shown in FIG. 11A and FIG. 11B. Therefore, even if the electrolyte solution is evaporated and dispersed in the casing 3a when the slit 23 is opened, the electrolyte solution in the casing 3a is hardly released from the slit 23.

Then, when the internal pressure of the casing 3a becomes less than the certain value, the slit 23 is closed. This is because the thickness of the pressure valve 10 relative to the front-rear direction gets smaller towards the upper side, and a strained force acts on the slit 23 in the open-state, at a front portion 31 and a rear portion 32 facing each other across the slit 23 in the front-rear direction (See FIG. 4A).

From this state, when the internal pressure of the gas in the casing 3a once again reaches the certain value, the slit 23 opens and the gas in the casing 3a is released. Then, when the internal pressure of the casing 3a drops below the certain value, the slit 23 is closed. The opening and closing of the slit 23 is repeated as described above.

As hereinabove described, in the electrolytic capacitor 1 including the pressure valve 10 of the present embodiment, the tapered portion 22 is formed on the pressure valve 10, and the slit 23 is formed on the top portion 22t of the tapered portion 22. This allows a strained force to act on the slit 23 turned into the open-state through elastic deformation of the slit 23.

The state of the slit 23 changes to the open-state only when the internal pressure of the casing 3a reaches the certain value so as to release the internal pressure of the casing 3a. When the internal pressure of the casing 3a becomes less than the certain value, the strained force changes the state of the slit 23 back to the close-state and keeps the state. As the result, the internal pressure of the casing 3a having reached the certain value is released without rupturing the pressure valve 10, thus contributing to improved life of the electrolytic capacitor 1. Further, the structure exerts an action of allowing only a flow of a gas and the like from the inside to the outside of the casing 3a, and prohibits a flow from the outside to the inside of the casing 3a (check-valve action), an entry of a contaminant into the casing 3a (contamination) is prevented.

Further, the slit 23 is rectilinearly formed in a plan view of the pressure valve 10, and this facilitates action of a force (strained force) that brings the front portion 31 and the rear portion 32 sandwiching the slit 23 close to each other in the front-rear direction. Thus, the check-valve action is achieved more effectively.

Further, when the pressure valve 10 is arranged in the seal member 3b, at least part of the valve main body 11 is arranged in the through hole 30, and the flange 12 is arranged below the wall portion 3b1 surrounding the through hole 30. Thus, even when the internal pressure in the casing 3a reaches the certain value and pushes the pressure valve 10 towards outside the casing 3a, the flange 12 is hooked on the wall portion 3b1, thus preventing the pressure valve 10 from departing from the seal member 3b.

Second Embodiment

Figure 6A:
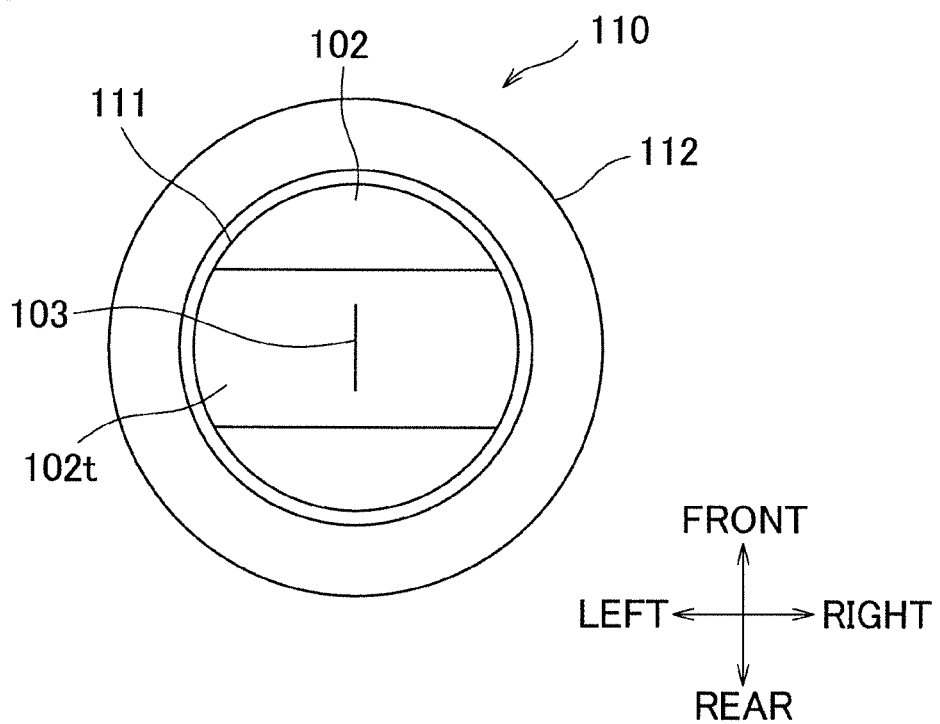
FIG. 6A A plan view showing a state where a slit of a pressure valve in an electrolytic capacitor related to a second embodiment of the present invention is closed.
Figure 6B:
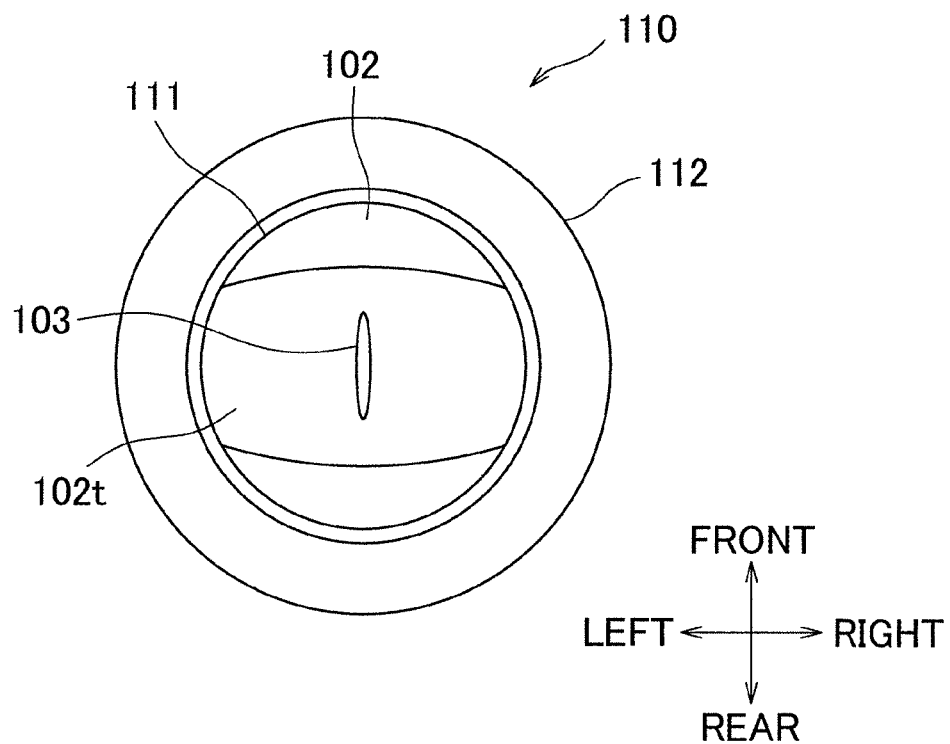
FIG. 6B A plan view showing a state where the slit of the pressure valve shown in FIG. 6A is opened.

Next, the following describes a second embodiment of the present invention with reference to FIG. 6A and FIG. 6B. The second embodiment differs from the first embodiment in the shape of the taper and the direction of the slit. Structures identical to those of the first embodiment are given the same reference symbols and the description therefore are omitted as needed.

A pressure valve 110 of the present embodiment is arranged in the seal member so that the tip thereof is positioned outside the casing 3a whereas its base end positioned inside the casing 3a.

The pressure valve 110 includes a valve main body 111 extended in a vertical direction, and a flange 112 connected to the base end of the valve main body 111, as in the pressure valve 10 of the first embodiment. As in the pressure valve 10 shown in FIG. 4A, the valve main body 111 includes: a tubular cylindrical portion extended upward from the base end; and a tapered portion 102 formed above the cylindrical portion.

The tapered portion 102 has a tapered shape which is tapered relative to the front-rear direction in FIG. 6A (a direction parallel to an extending direction of a later-described slit 103), as it gets closer to the tip of the valve main body 111 (i.e., the thickness relative to the front-rear direction gets smaller towards upper side). It should be noted that the width of the tapered portion 102 is constant relative to the left-right direction (a direction perpendicular to the extending direction of the slit 103) (i.e., the thickness relative to the left-right direction is the same at any position relative to the vertical direction).

In the uppermost position of the tapered portion 102, an elongated top portion 102t is formed. The top portion 102t has substantially a rectangular planar shape whose size relative to the left-right direction is longer than the size relative to the front-rear direction, as is the case of the top portion 22t related to the first embodiment. The top portion 102t of the present embodiment is formed so as to be wider in the front-rear direction as compared to the top portion 22t of the first embodiment.

The top portion 102t has a rectilinear slit 103 which is long in the front-rear direction. The periphery of the slit 103 is elastically deformable, so that the slit 103 is state-changeable between a close-state and an open-state. When the slit 103 opens, the internal space of the pressure valve 110 communicates with the outside.

Next, opening and closing operations of the slit 103 are described.

When the internal pressure of the casing 3a is less than a certain value, the close-state of the slit 103 as shown in FIG. 6A is maintained.

When the internal pressure in the casing 3a reaches the certain value, the slit 103 opens as shown in FIG. 6B, and communicates the inside and the outside of the casing 3a, thus releasing the internal pressure of the casing 3a. This way the gas inside the casing 3a is released.

Then, when the internal pressure of the casing 3a becomes less than the certain value, the slit 103 is closed. From this state, when the internal pressure of the gas in the casing 3a once again reaches the certain value, the slit 103 opens and the gas in the casing 3a is released. Then, when the internal pressure of the casing 3a drops below the certain value, the slit 103 is closed. The opening and closing of the slit 103 is repeated as described above.

In the first embodiment, the flat shape of the top portion 22t of the tapered portion 22 is elongated in the left-right direction, and the slit 23 extends in the left-right direction.

Therefore, if a rapid increase in the internal pressure in the casing 3a is repeated, the pressure valve 10 may crack at both ends of the slit 23, in the direction in which the slit 23 extends, at a time when the slit 23 opens, thus causing an increase in the slit length. When the slit length increases, the withstand pressure, i.e., the valve operating pressure, likely drops. In the present embodiment on the other hand, the flat shape of the top portion 102t of the tapered portion 102 is elongated in the left-right direction, and the slit 103 extends in the front-rear direction. Therefore, it is possible to effectively prevent an increase in the slit length caused by the pressure valve 110 cracking at both ends of the slit 103, in the direction in which the slit 103 extends, at a time when the slit 103 opens. Therefore, even if rapid increase in the internal pressure in the casing 3a is repeated, the withstand pressure hardly drops.

In the present embodiment, with the taper shape of the tapered portion 102, the thickness relative to the left-right direction is constant, irrespective of the size in the vertical direction, i.e., the height relative to the axial direction, and the thickness relative to the front-rear direction becomes smaller as it gets closer to the tip. Therefore, it is possible to more effectively prevent an increase in the slit length, because there will be a larger force acting which restrains the pressure valve 110 from cracking at both ends of the slit 103, in the direction in which the slit 103 extends, at a time when the slit 103 opens.

Further, in the present embodiment, the slit 103 extends in the front-rear direction, i.e., in a direction perpendicular to the length of the elongated top portion 102t (left-right direction). Therefore, it is possible to more effectively prevent an increase in the slit length, because there will be a larger force acting which restrains the pressure valve 110 from cracking at both ends of the slit 103, in the direction in which the slit 103 extends, at a time when the slit 103 opens.

It should be noted that the tapered shape of the tapered portion 102 does not necessarily have to be the shape described in the present embodiment, as long as the flat shape of the top portion 102t is elongated in one direction. Further, the direction in which the slit 103 extends is preferably perpendicular to the above one direction; however, the direction does not necessarily have to be perpendicular, as long as it crosses the above one direction.

Third Embodiment

Figure 7:
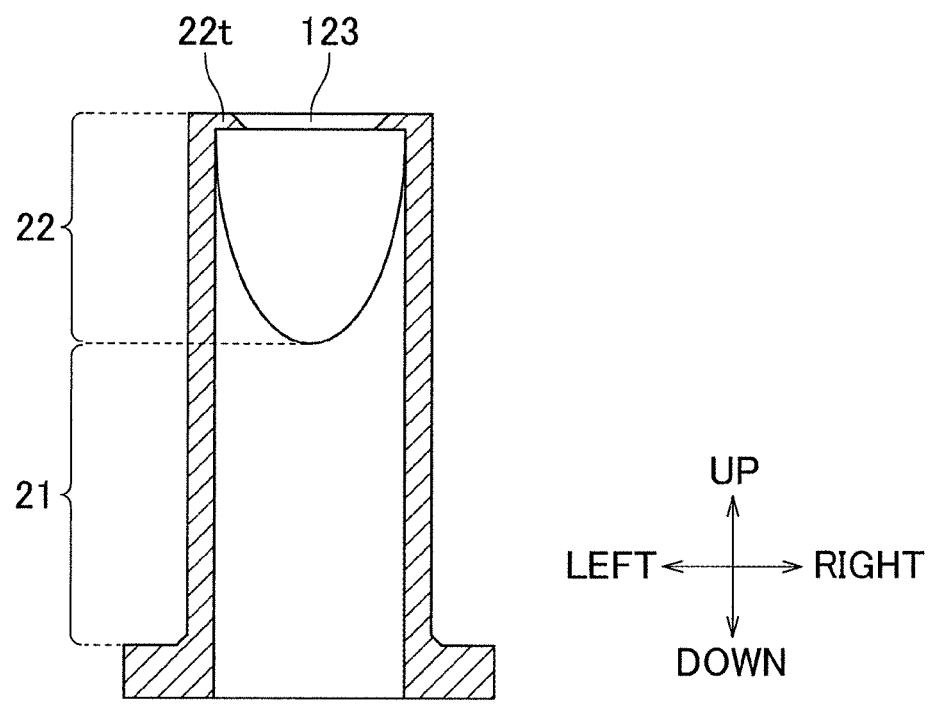
FIG. 7 A cross sectional view of a pressure valve in an electrolytic capacitor related to a third embodiment of the present invention.

Next, the following describes a third embodiment of the present invention with reference to FIG. 7. The third embodiment differs from the first embodiment and the second embodiment in the shape of the slit. Structures identical to those of the first embodiment are given the same reference symbols and the description therefore are omitted as needed.

A slit 123 is rectilinearly formed in the left-right direction in a top portion 22t of a tapered portion 22. The slit 123 is tapered in such a manner that its width relative to the left-right direction becomes wider towards upper side. The width of the upper end of the slit 123 is the same as the width of the slit 23 of the first embodiment.

In the third embodiment too, with the above structure, the slit 123 opens when the internal pressure of the casing 3a reaches a certain value, and the gas in the casing 3a is released through the slit 123 as in the first embodiment. Therefore, the electrolyte solution is hardly released from the slit 123 even when the slit 123 opens. Further, the internal pressure of the casing 3a having reached the certain value is released without rupturing the pressure valve, thus contributing to improved life of the electrolytic capacitor. A decrease in the life of the electrolytic capacitor 1 is therefore restrained. When the gas drops below the certain value, the slit 123 closes and functions as a check valve.

Further, since the slit 123 is tapered in such a manner as to vary in the thickness direction of its top portion 22t, the structural strength is ensured and a larger strained force is obtained. This way, the check-valve action is achieved more effectively.

Fourth Embodiment

Figure 8:
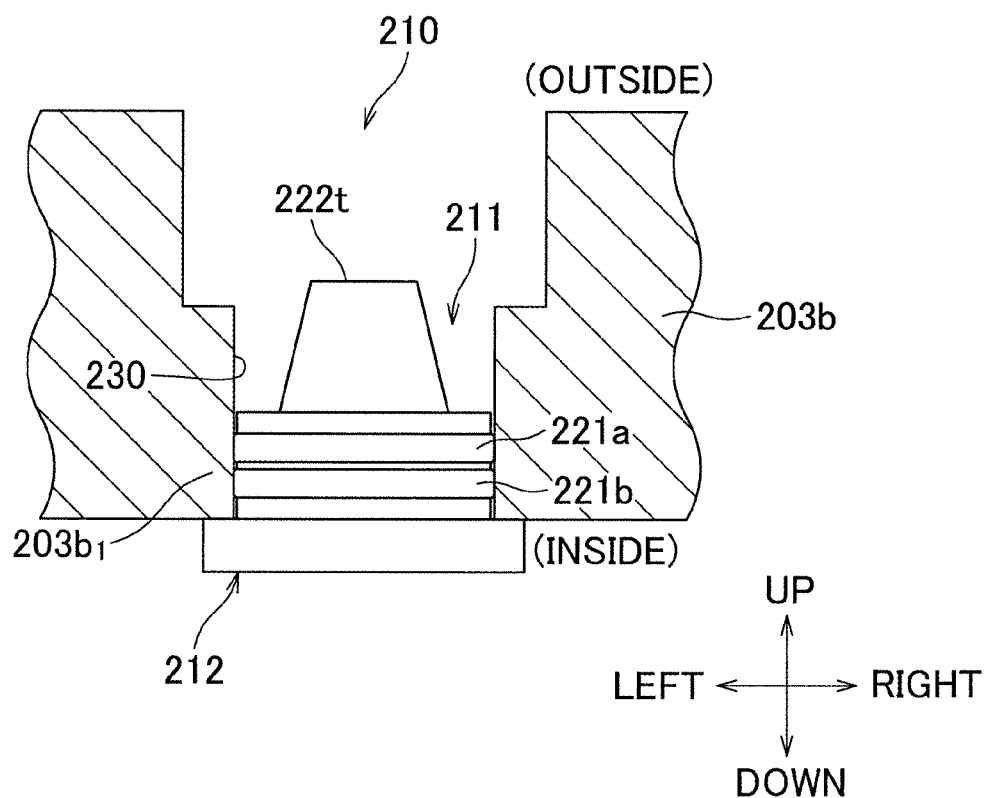
FIG. 8 A front view enlarging the periphery of a pressure valve in an electrolytic capacitor related to a fourth embodiment of the present invention.

Next, the following describes a fourth embodiment of the present invention with reference to FIG. 8 and FIG. 9. The fourth embodiment differs from the first embodiment in the shape of the pressure valve. Structures identical to those of the first embodiment are given the same reference symbols and the description therefore are omitted as needed.

As shown in FIG. 8, a pressure valve 210 includes a valve main body 211 arranged in a through hole 230 of a seal member 203b, and a flange 212 connected to the base end of the valve main body 211. The flange 212 has a diameter greater than the through hole 230, and is arranged below a wall portion 203b1 surrounding the through hole 230 of the seal member 203b.

Figure 9A:
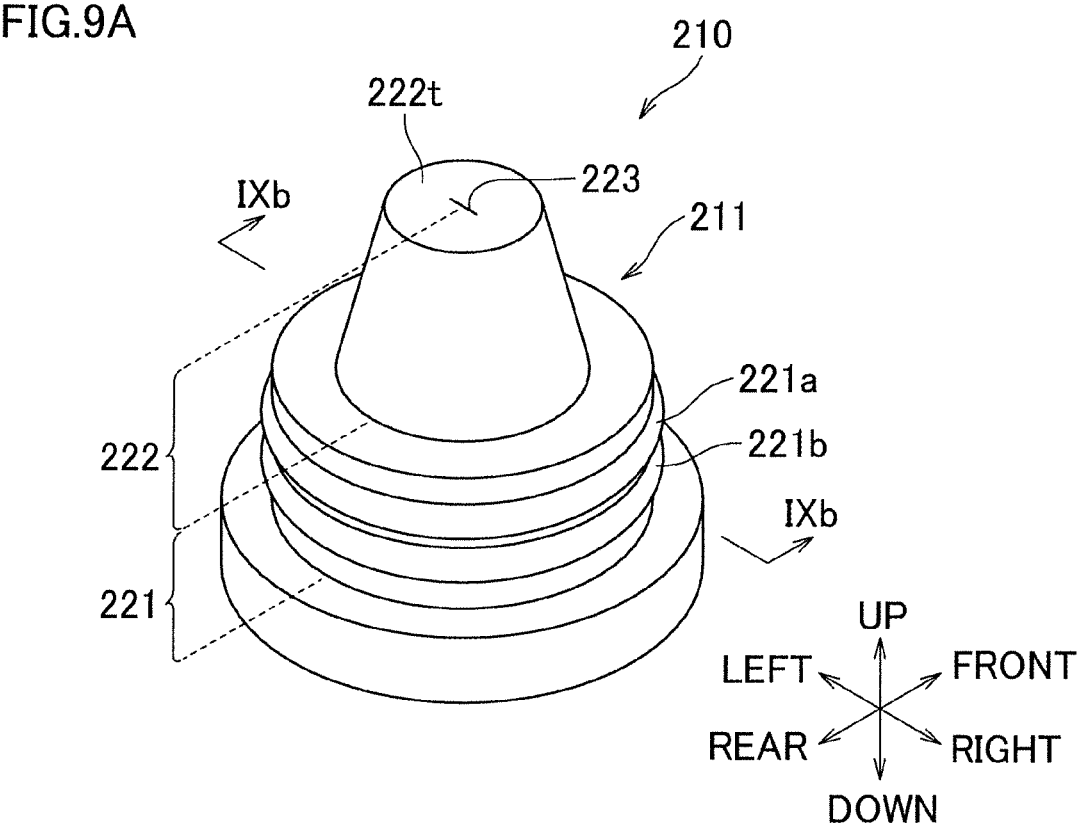
FIG. 9A A perspective view of a pressure valve in an electrolytic capacitor related to the fourth embodiment of the present invention.

As shown in FIG. 9A, the valve main body 211 includes: a substantially circle-tubular cylindrical portion 221; and a tapered portion 222 formed in a circular frustum shape and arranged above the cylindrical portion 221. The tapered portion 222 has a tapered shape such that the diameter gets smaller as it gets closer to the tip of the valve main body 211.

In the cylindrical portion 221, two large diameter portions 221a and 221b having a larger diameter than the other portions are formed. The diameter of each of the large diameter portions 221a and 221b is slightly larger than the diameter of the through hole 230 shown in FIG. 8. Therefore, by arranging the valve main body 211 in the through hole 230, the large diameter portions 221a and the 221b seal the cylindrical portion 221 and the seal member 203b (FIG. 8).

Figure 9B:
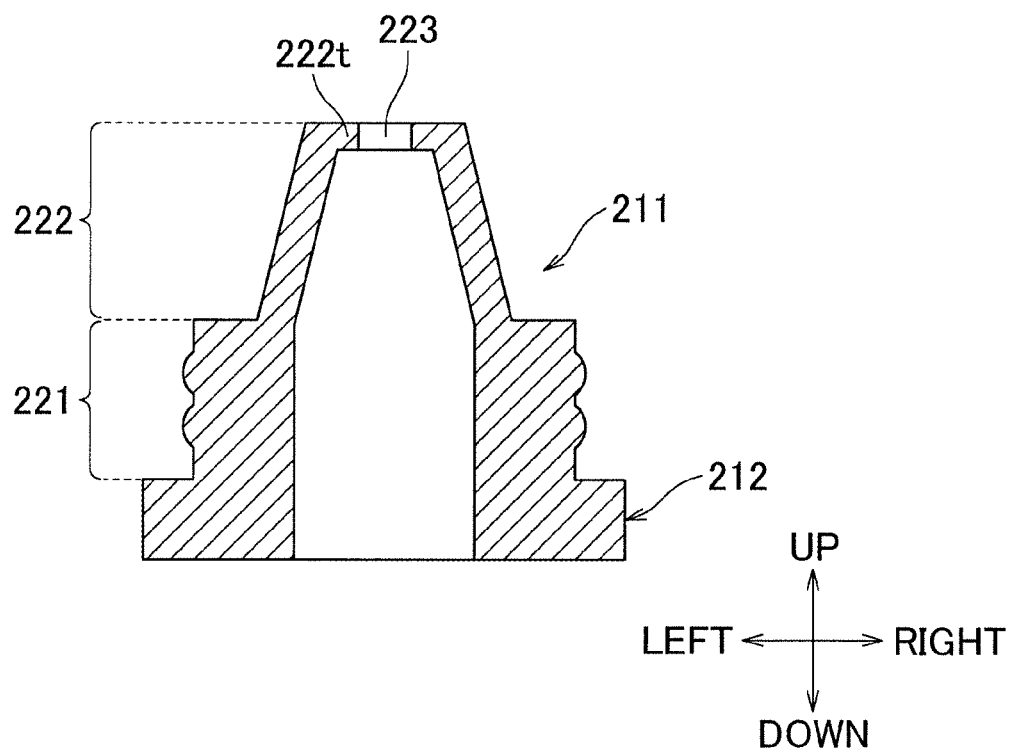
FIG. 9B A cross sectional view of the pressure valve, taken along a line IXb-IXb of FIG. 9A.

As shown in FIG. 9A, a top portion 222t of the tapered portion 222 has a circular shape. The top portion 222t has a short rectilinear slit 223 which extends in the left-right direction. As shown in FIG. 9B, the top portion 222t has a thick thickness. The width of the slit 223 relative to the left-right direction is constant through the thickness direction (vertical direction) of the top portion 222t (i.e., the width relative to the left-right direction is the same any position relative to the vertical direction).

The pressure valve 210 is a hollow member whose lower end is open. When the slit 223 opens, the internal space of the pressure valve 210 communicates with the outside.

When the internal pressure of the casing 3a shown in FIG. 1B is less than a certain value, the slit 223 is closed (see FIG. 9A and FIG. 9B). When the internal pressure in the casing 3a reaches the certain value, the slit 223 opens and the gas in the casing 3a is released. Then, when the internal pressure in the casing 3a drops below the certain value, the slit 223 is closed. The opening and closing of the slit 223 is repeated as described above. As the result, the internal pressure of the casing 3a having reached the certain value is released without rupturing the pressure valve 210, thus contributing to improved life of the electrolytic capacitor.

In the fourth embodiment too, with the above structure, the slit 223 opens when the internal pressure of the casing 3a reaches a certain value, and the gas in the casing 3a is released through the slit 223 as in the first embodiment. With the slit 223 closing when the internal pressure of the casing 3a drops below the certain value, the electrolyte solution is hardly released from the slit 223. Therefore, a decrease in the life of the electrolytic capacitor is therefore restrained. When the internal pressure of the casing 3a drops below the certain value, the slit 223 is closed and functions as a check valve.

Further, since the tapered portion 222 has a circular frustum shape, a force towards the center of the top portion 222t acts in the surrounding portion of the slit 223 at the top portion 222t, and this force is converged on the slit 223 to close the slit 223. Thus, the check valve function is achieved more effectively.

Further, since the slit 223 is short, the force directed to the center of the top portion 222t easily acts in the surrounding portion of the slit 223. Further, since the thickness of the top portion 222t is thick, the strained force becomes greater than the one in cases where the thickness of the top portion 222t is thin. Thus, the check valve function is achieved more effectively.

Examples

The following describes more specifically the present invention with reference to an Examples.

In No. 1 to No. 3 of the Examples, the pressure valve of the third embodiment shown in FIG. 7 was used. In the pressure valve, the cylindrical portion was 10 mm in height and 4 mm in diameter, the tapered portion was 5 mm in height, and the width of the slit relative to the left-right direction was 0.5 mm at the upper end, and 0.3 mm at the lower end.

In No. 4 to No. 6 of Examples of conventional art, a circular plate (diameter: 8 mm) pressure valve shown in FIG. 11A was used.

The diameter of the cylindrical through hole formed in the seal member was 4 mm.

Electrolytic capacitor (5000 hours guaranteed) with 76.2 mm in diameter, 90 mm in height, a rated voltage of 400 V, and an electrostatic capacity of 4700 μF was used in each of Examples No. 1 to No. 3 and Conventional Art Examples of No. 4 to No. 6. The electrolytic capacitor was subjected to the rated voltage (400 V) at an ambient temperature of 105° C., and left alone to test its reliability. Table 1 shows the parameters before the test of leaving it alone (initial stage) and after leaving it for 8000 hours.

TABLE 1

| | TEST No. | INITIAL STAGE | | | AFTER 8000 HOURS | | | | |
|---|---|---|---|---|---|---|---|---|---|
| | | ELECTRO-STATIC CAPACITY Cap (μF) | TANGENT OF LOSS ANGLE tan δ | LEAKAGE CURRENT LC (μA) | ELECTRO-STATIC CAPACITY Cap (μF) | TANGENT OF LOSS ANGLE tan δ | LEAKAGE CURRENT LC (μA) | APPEAR-ANCE | DETERMI-NATION |
| EXAMPLES | 1 | 4153 | 0.039 | 185 | 4108 | 0.045 | 151 | — | NO PROBLEM |
| | 2 | 4158 | 0.039 | 178 | 4097 | 0.046 | 162 | — | NO PROBLEM |
| | 3 | 4156 | 0.038 | 187 | 4097 | 0.045 | 151 | — | NO PROBLEM |
| CONVEN-TIONAL EXAMPLES | 4 | 4155 | 0.039 | 173 | 2105 | 0.359 | 151 | VALVE OPERATION* | BROKEN |
| | 5 | 4154 | 0.041 | 153 | 2099 | 0.367 | 152 | VALVE OPERATION* | BROKEN |
| | 6 | 4157 | 0.038 | 169 | 2103 | 0.371 | 143 | VALVE OPERATION* | BROKEN |

VALVE OPERATION: VALVE IS RUPTURED

The "APPEARANCE" in Table 1 was determined by visual confirmation. For Examples No. 1 to No. 3, no rupture was confirmed in the pressure valves and no problem such as breakdown has taken place in the electrolytic capacitors, even after elapse of 8000 hours. Further, the electrostatic capacity (Cap), the tangent of loss angle (tan δ), and the leakage current (LC) did not change very much even after elapse of 8000 hours.

It is thought this is because the gas is released through the slit when the internal pressure of the casing reaches a certain value, but the electrolyte solution is hardly released. Further, the pressure valve was usable even after elapse of 8000 hours.

For the conventional art examples of No. 4 to No. 6, the electrostatic capacity (Cap) decreased to approximately a half, and the tangent of loss angle (tan δ) has increased nearly ten times, and the pressure valves were ruptured and the electrolytic capacitors were broken, after elapse of 8000 hours. It is thought this is because electrolyte solution was released from the ruptured hole formed in the pressure valves.

Thus, the embodiment of the present invention is described hereinabove based on the drawings. However, the specific structure of the present invention shall not be interpreted as to be limited to the above described embodiment. Accordingly, the preferred embodiments of the present invention as set forth above are intended to be illustrative, not limiting. Various changes may be made without departing from the spirit and scope of the invention as defined in the following claims.

For example, although the valve main body 11 of the first embodiment has a cylindrical portion 21, a structure of not having the cylindrical portion 21 may be adoptable. Further, the valve main body 111 of the second embodiment has the cylindrical portion, the valve main body 211 of the third embodiment has the cylindrical portion 21, and the valve main body 311 of the fourth embodiment has the cylindrical portion 321; however, these valve main bodies may be structured without a cylindrical portion.

Further, in the above-described fourth embodiment, the tapered portion 222 has a circular frustum shape; however, the tapered portion 222 may have a polygonal frustum shape, e.g., a triangular frustum shape, a quadrangular frustum shape, or a pentagonal frustum shape.

Further, in the above-described first to fourth embodiments, the slits 23, 103, 123, 223 are all rectilinear in the left-right direction; however, the shape of the slit is modifiable. For example, the slit may have a wave shape.

Further, in the above-described fourth embodiment, the width of the slit 223 relative to the left-right direction is constant through the thickness direction of the top portion 222t; however, the width of the slit 223 relative to the left-right direction may be tapered in the thickness direction of the top portion 222t. This ensures the structural strength, and the check valve function is more effectively achieved. Similarly, in the second embodiment, the width of the slit 103 relative to the left-right direction may be varied in the thickness direction of the top portion 102.

Figure 10:
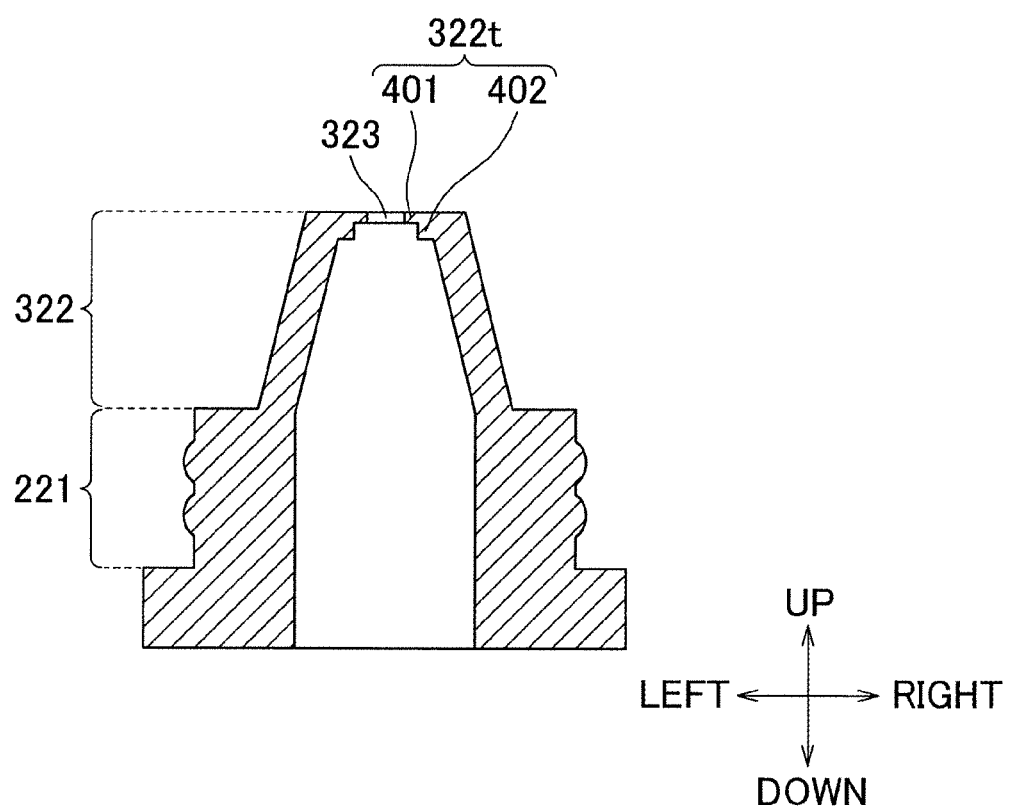
FIG. 10 A cross sectional view showing a modification of the pressure valve in the electrolytic capacitor related to a fourth embodiment of the present invention.

Further, in the above-described fourth embodiment, the thickness of the top portion 222t of the tapered portion 222 is thick; however, the structure of the top portion 222t is not limited to this. For example, as shown in FIG. 10, a thin portion 401 may be formed at the center portion of a top portion 322t of a tapered portion 322 and a thick portion 402 thicker than the thin portion 401 may be formed therearound. The slit 323 may be formed in the thin portion 401.

The embodiment of the present invention deals with a case of an electrolytic capacitor; however, the pressure valve of the present invention is applicable to an electric double layer capacitor.

The invention claimed is:

1. A pressure valve to be arranged in a seal member configured to seal a casing accommodating therein a capacitor element, in such a manner that a base end of the pressure valve is positioned inside the casing whereas a tip of the pressure valve is positioned outside the casing, the pressure valve comprising a tapered portion having a tapered shape, wherein
a top portion of the tapered portion has a slit which is state-changeable between an open-state and a close-state through elastic deformation; and
the slit is formed in a tapered shape such that a width of one end portion of the top portion relative to its thickness direction is wider than another end portion,
the slit keeps its close-state while a casing internal pressure is less than a certain value, whereas
the slit changes its state to the open-state when the casing internal pressure reaches the certain value, thereby releasing the casing internal pressure by communicating the inside and the outside of the casing.

2. The pressure valve according to claim 1, wherein the tapered portion is formed in a circular frustum shape or a polygonal frustum shape.

3. The pressure valve according to claim 1, wherein: the top portion of the tapered portion has a flat shape such that a length relative to a first direction which is perpendicular to an axial direction connecting the tip and the base end is longer than a second direction which is perpendicular to the axial direction and to the first direction, and the slit extends in a direction crossing the first direction.

4. The pressure valve according to claim 3, wherein the tapered shape is such that the thickness relative to the first direction is constant irrespective of the height relative to the axial direction, and the thickness relative to the second direction is reduced as it gets closer to the tip.

5. The pressure valve according to claim 3, wherein the slit extends in the second direction.

6. The pressure valve according to claim 1, wherein the slit is rectilinearly formed in a plan view.

7. The pressure valve according to claim 1, wherein the slit is formed in a tapered shape such that a width of the slit relative to its extending direction is widened as it gets closer to the tip.

8. The pressure valve according to claim 1, comprising a valve main body to be at least partially arranged in a through hole formed on the seal member, and a flange connected to the base end of the valve main body, whose diameter is larger than the through hole, wherein the tapered portion is formed at the tip of the valve main body.

9. An electrolytic capacitor, comprising: the pressure valve according to claim 1;

a seal member in which the pressure valve is arranged;
a casing sealed by the seal member; and
a capacitor element accommodated in the casing.

* * * * *